US 10,763,718 B2

(12) United States Patent
Koga et al.

(10) Patent No.: US 10,763,718 B2
(45) Date of Patent: Sep. 1, 2020

(54) STATOR CORE AND METHOD FOR MANUFACTURING THE SAME

(71) Applicant: AISIN AW CO., LTD., Anjo-shi, Aichi-ken (JP)

(72) Inventors: Kiyotaka Koga, Nishio (JP); Shingo Hashimoto, Okazaki (JP); Shingo Sato, Okazaki (JP)

(73) Assignee: SISIN AW CO., LTD., Anjo (JP)

( * ) Notice: Subject to any disclaimer, the term of this patent is extended or adjusted under 35 U.S.C. 154(b) by 383 days.

(21) Appl. No.: 15/561,176

(22) PCT Filed: Apr. 15, 2016

(86) PCT No.: PCT/JP2016/062135
§ 371 (c)(1),
(2) Date: Feb. 13, 2018

(87) PCT Pub. No.: WO2016/167356
PCT Pub. Date: Oct. 20, 2016

(65) Prior Publication Data
US 2018/0159398 A1 Jun. 7, 2018

(30) Foreign Application Priority Data
Apr. 16, 2015 (JP) .................. 2015-084275

(51) Int. Cl.
*H02K 3/48* (2006.01)
*H02K 3/12* (2006.01)
(Continued)

(52) U.S. Cl.
CPC .............. *H02K 3/48* (2013.01); *H02K 1/165* (2013.01); *H02K 3/12* (2013.01); *H02K 3/34* (2013.01);
(Continued)

(58) Field of Classification Search
CPC .... H02K 1/165; H02K 15/066; H02K 15/085; H02K 15/12; H02K 15/0031; H02K 3/00–3/528
(Continued)

(56) References Cited

U.S. PATENT DOCUMENTS 3,618,337 A 11/1971 Mount
2011/0260572 A1* 10/2011 Hiraga ................ H02K 3/345
310/207
(Continued)

FOREIGN PATENT DOCUMENTS

DE 10 2008 020 426 A1 10/2009
JP 2003-143791 A 5/2003
(Continued)

OTHER PUBLICATIONS

Machine Translation, Takebe, JP-2011120356-A, Jun. 2011. (Year: 2011).*
(Continued)

*Primary Examiner* — Thomas Truong
(74) *Attorney, Agent, or Firm* — Oliff PLC

(57) ABSTRACT

In this stator core, the interval in the circumferential direction of the stator core between an outer peripheral surface of an axial end of a slot accommodated portion of a concentric coil and a tooth facing the outer peripheral surface is larger than the interval in the circumferential direction of the stator core between an inner peripheral surface of the axial end and a tooth facing the inner peripheral surface.

12 Claims, 6 Drawing Sheets

(51) Int. Cl.
*H02K 3/34* (2006.01)
*H02K 1/16* (2006.01)
*H02K 15/12* (2006.01)
*H02K 15/06* (2006.01)
*H02K 15/085* (2006.01)
*H02K 15/00* (2006.01)

(52) U.S. Cl.
CPC ......... *H02K 15/066* (2013.01); *H02K 15/085* (2013.01); *H02K 15/12* (2013.01); *H02K 15/0031* (2013.01)

(58) Field of Classification Search
USPC ........................................ 310/179, 201, 208
See application file for complete search history.

(56) References Cited

U.S. PATENT DOCUMENTS

| | | | |
|---|---|---|---|
| 2011/0291423 | A1 | 12/2011 | Germishuizen et al. |
| 2013/0069456 | A1 | 3/2013 | Matsuki et al. |
| 2013/0151057 | A1 | 6/2013 | Matsubara et al. |
| 2014/0292119 | A1 | 10/2014 | Takahashi |

FOREIGN PATENT DOCUMENTS

| | | | | |
|---|---|---|---|---|
| JP | 2009-189078 | A | | 8/2009 |
| JP | 2011-120356 | A | | 6/2011 |
| JP | 2011120356 | A | * | 6/2011 |
| JP | 2012-5289 | A | | 1/2012 |
| JP | 2012-023818 | A | | 2/2012 |
| JP | 2012023818 | A | * | 2/2012 |
| JP | 2012-090511 | A | | 5/2012 |
| JP | 2013-132151 | A | | 7/2013 |
| JP | 2014-183647 | A | | 9/2014 |
| JP | 2015/61491 | A | | 3/2015 |
| WO | 2014/020755 | A1 | | 2/2014 |

OTHER PUBLICATIONS

Machine Translation, Nigo, JP-2012023818-A, Feb. 2012. (Year: 2012).*
Mar. 2, 2018 Supplemental European Search Report issued in European Patent Application No. 16780144.8.
Mar. 2, 2018 Supplemental European Search Report issued in European Patent Application No. 16780147.1.
Jul. 5, 2016 International Search Report issued in International Patent Application No. PCT/JP2016/062127.
U.S. Appl. No. 15/561,188, filed Sep. 25, 2017 in the name of Koga et al.
Mar. 2, 2018 Supplemental European Search Report issued in Europran Patent Application No. 16780144.8.
Jul. 5, 2016 International Search Report issued in Patent Application No. PCT/JP2016/062135.

* cited by examiner

STATOR CORE AND METHOD FOR MANUFACTURING THE SAME

BACKGROUND

The present disclosure relates to stators and methods for manufacturing the same.

Conventionally, a method for fixing a coil to a stator etc. is known in which the space between a coil made of a round wire and each coil mounting portion of a stator is impregnated with varnish by using capillary action (see, e.g., WO 2014/020755).

In the case of a coil made of a rectangular wire, tubular clearances that cause capillary action are less likely to be formed in a coil end projecting from a stator core. Capillary action is therefore less likely to occur in coils made of a rectangular wire.

SUMMARY

WO 2014/020755 does not disclose impregnation with varnish for coils made of a rectangular wire.

An exemplary aspect of the disclosure provides a stator and a method for manufacturing the same, in which, even in the case of using a coil made of a rectangular wire, slots can be sufficiently filled with a fixing agent and the coil can be fixed firmly.

A stator according to a first aspect of the present disclosure includes: a stator core including a plurality of teeth and a plurality of slots each located between adjacent ones of the teeth; and a concentric coil formed by concentrically winding a rectangular wire and placed in the slots of the stator core. An interval in a circumferential direction of the stator core between an outer peripheral surface of an axial end of a slot accommodated portion of the concentric coil about a winding center of the concentric coil and the tooth facing the outer peripheral surface is larger than an interval in the circumferential direction of the stator core between an inner peripheral surface of the axial end of the slot accommodated portion of the concentric coil about the winding center of the concentric coil and the tooth facing the inner peripheral surface.

In the stator according to the first aspect of the present disclosure, as described above, the interval in the circumferential direction of the stator core between the outer peripheral surface of the axial end of the slot accommodated portion of the concentric coil about the winding center of the concentric coil and the tooth facing the outer peripheral surface is larger than the interval in the circumferential direction of the stator core between the inner peripheral surface of the axial end of the slot accommodated portion of the concentric coil about the winding center of the concentric coil and the tooth facing the inner peripheral surface. Accordingly, in the case where a fixing agent such as varnish is supplied to the outer peripheral surface of the concentric coil, the fixing agent can be easily guided into the slot when flowing along the outer peripheral surface of the concentric coil, because of the large interval (clearance) in the circumferential direction between the outer peripheral surface of the axial end of the slot accommodated portion and the tooth. As a result, even in the case of using a coil made of a rectangular wire, the slots can be sufficiently filled with the fixing agent and the coil can be fixed firmly.

A method for manufacturing a stator according to a second aspect of the present disclosure is a method for manufacturing a stator including a stator core including a plurality of teeth and a plurality of slots each located between adjacent ones of the teeth, and a concentric coil formed by concentrically winding a rectangular wire and placed in the slots of the stator core. The method includes the steps of: placing the concentric coil in the slots so that an interval in a circumferential direction of the stator core between an outer peripheral surface of an axial end of a slot accommodated portion of the concentric coil about a winding center of the concentric coil and the tooth facing the outer peripheral surface is larger than an interval in the circumferential direction of the stator core between an inner peripheral surface of the axial end of the slot accommodated portion of the concentric coil about the winding center of the concentric coil and the tooth facing the inner peripheral surface; and with the stator core being placed so that its axial end face faces upward, supplying a fixing agent so that the fixing agent flows along the outer peripheral surface of the concentric coil, thereby filling the slots with the fixing agent.

As described above, the method for manufacturing a stator according to the second aspect of the present disclosure includes the step of: placing the concentric coil in the slots so that the interval in the circumferential direction of the stator core between the outer peripheral surface of the axial end of the slot accommodated portion of the concentric coil about the winding center of the concentric coil and the tooth facing the outer peripheral surface is larger than the interval in the circumferential direction of the stator core between the inner peripheral surface of the axial end of the slot accommodated portion of the concentric coil about the winding center of the concentric coil and the tooth facing the inner peripheral surface. Accordingly, the fixing agent can be easily guided into the slot when flowing along the outer peripheral surface of the concentric coil, because of the large interval (clearance) in the circumferential direction between the outer peripheral surface of the axial end of the slot accommodated portion and the tooth. As a result, a method for manufacturing a stator can be provided in which, even in the case of using a coil made of a rectangular wire, the slots can be sufficiently filled with the fixing agent and the coil can be fixed firmly.

According to the present disclosure, as described above, even in the case of using a coil made of a rectangular wire, the slots can be sufficiently filled with the fixing agent and the coil can be fixed firmly.

DETAILED DESCRIPTION OF EMBODIMENTS

Embodiments of the present disclosure will be described based on the accompanying drawings.

First Embodiment (Structure of Rotating Electrical Machine)

The structure of a rotating electrical machine 100 according to a first embodiment will be described with reference to FIGS. 1 to 7. FIGS. 2 to 5 and 11 and FIG. 12 showing a second embodiment are schematic views of an annular stator core 20 laid out flat, showing the radially inner side of the stator core 20 as viewed from the central axis of rotation of a rotor core 10.

Figure 1:
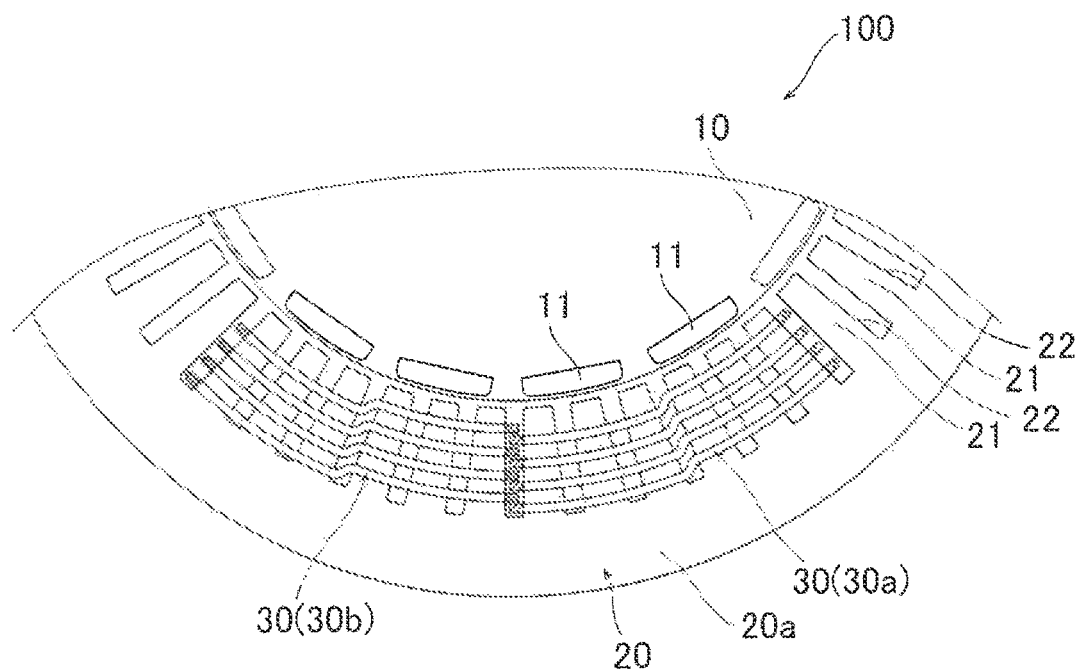
FIG. 1 is a plan view of a rotating electrical machine according to a first embodiment of the present disclosure.

As shown in FIG. 1, the rotating electrical machine 100 includes the rotor core 10. The rotor core 10 is provided with a plurality of permanent magnets 11. The plurality of permanent magnets 11 are arranged at substantially regular angular intervals in the circumferential direction.

The rotating electrical machine 100 further includes the stator core 20 disposed so as to face the rotor core 10 in the radial direction. The stator core 20 includes a plurality of teeth 21 and a plurality of slots 22 each located between adjacent ones of the teeth 21. Concentric coils 30 each formed by concentrically winding a rectangular wire are placed in the slots 22 of the stator core 20.

(Structure of Concentric Coil)

Figure 2:
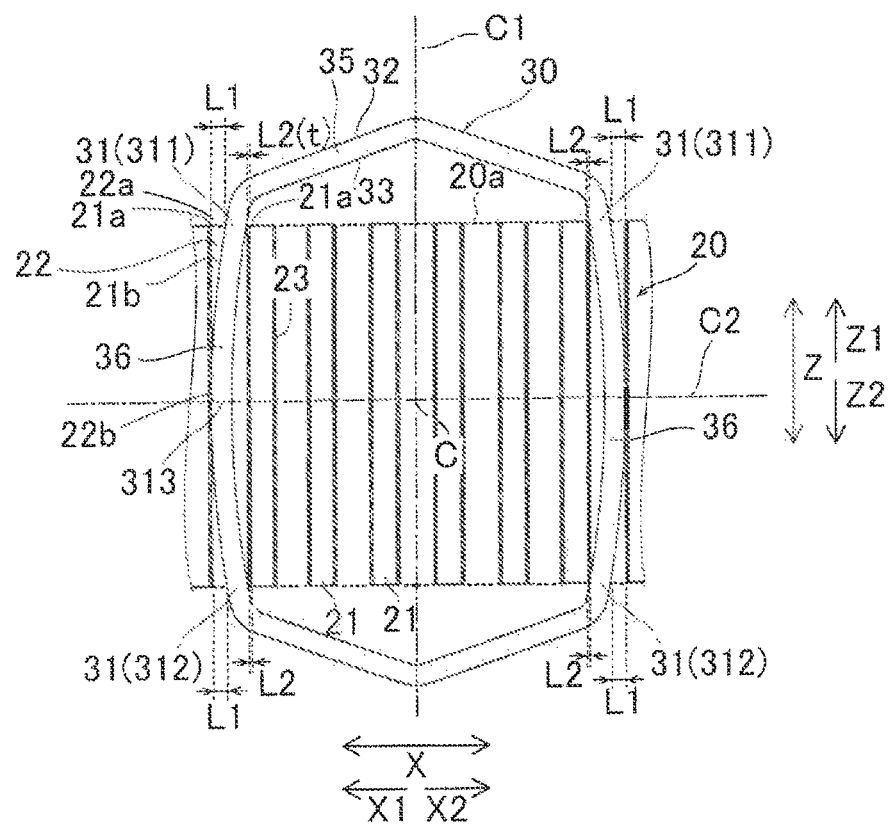
FIG. 2 is a diagram showing a single concentric coil placed in slots of the rotating electrical machine according to the first embodiment of the present disclosure.

The structure of the concentric coil 30 will be described with reference to FIGS. 2 and 3. FIG. 2 shows a single concentric coil 30 placed in the slots 22 of the stator core 20. The concentric coil 30 has a substantially symmetrical shape with respect to an axis C1 passing through the center of the concentric coil 30 in the Z direction, so that the X1 direction side and the X2 direction side of the concentric coil 30 are mirror images of each other. The structure of the X1 direction side of the concentric coil 30 will be described below.

The concentric coil 30 is a coil formed by concentrically winding a rectangular wire and is placed in the slots 22 of the stator core 20. In the first embodiment, as shown in FIGS. 2 and 3, an interval L1 in the circumferential direction of the stator core 20 between an outer peripheral surface 32 of an axial end 31 of a slot accommodated portion 36 of the concentric coil 30 about the winding center C of the concentric coil 30 and the tooth 21 facing the outer peripheral surface 32 is larger than an interval L2 in the circumferential direction of the stator core 20 between an inner peripheral surface 33 of the axial end 31 of the slot accommodated portion 36 of the concentric coil 30 about the winding center C of the concentric coil 30 and the tooth 21 facing the inner peripheral surface 33. The winding center C is the middle in the circumferential direction (X direction) between a pair of slot accommodated portions 36 of the concentric coil 30 and the middle in the axial direction (Z direction) between a pair of coil end portions 35 of the concentric coil 30 excluding lead portions, not shown. The lead portions are one end and the other end of the rectangular wire forming the concentric coil 30. The lead portions function as a power line for connection to an external circuit such as a power supply, a neutral line for connection to a connection point (neutral point) to a concentric coil 30 of another phase, etc.

Specifically, in the first embodiment, insulating paper 23 is placed between the concentric coil 30 and the slot 22. The inner peripheral surface 33 of the axial end 31 contacts the insulating paper 23. The axial end 31 and the tooth 21 (axial end 21a) located on the side (X2 direction side) facing the inner peripheral surface 33 of the axial end 31 are separated by the interval L2 in the circumferential direction which corresponds to the thickness t of the insulating paper 23. The insulating paper 23 is one example of the "insulating member."

In the first embodiment, as shown in FIG. 2, the interval L1 in the circumferential direction between each of the axial ends 31 (axial ends 311, 312) of the concentric coil 30 which are located at both ends on one side (Z1 direction side) and the other side (Z2 direction side) in the axial direction (Z direction) of the slot 22 and the tooth 21 (each axial end 21a) located on the side (X1 direction side) facing the outer peripheral surface 32 of the axial end 31 is larger than the interval L2 in the circumferential direction between each of the axial ends 31 (axial ends 311, 312) and the tooth 21 (each axial end 21a) located on the side (X2 direction side) facing the inner peripheral surface 33 of the axial end 31.

Figure 3:
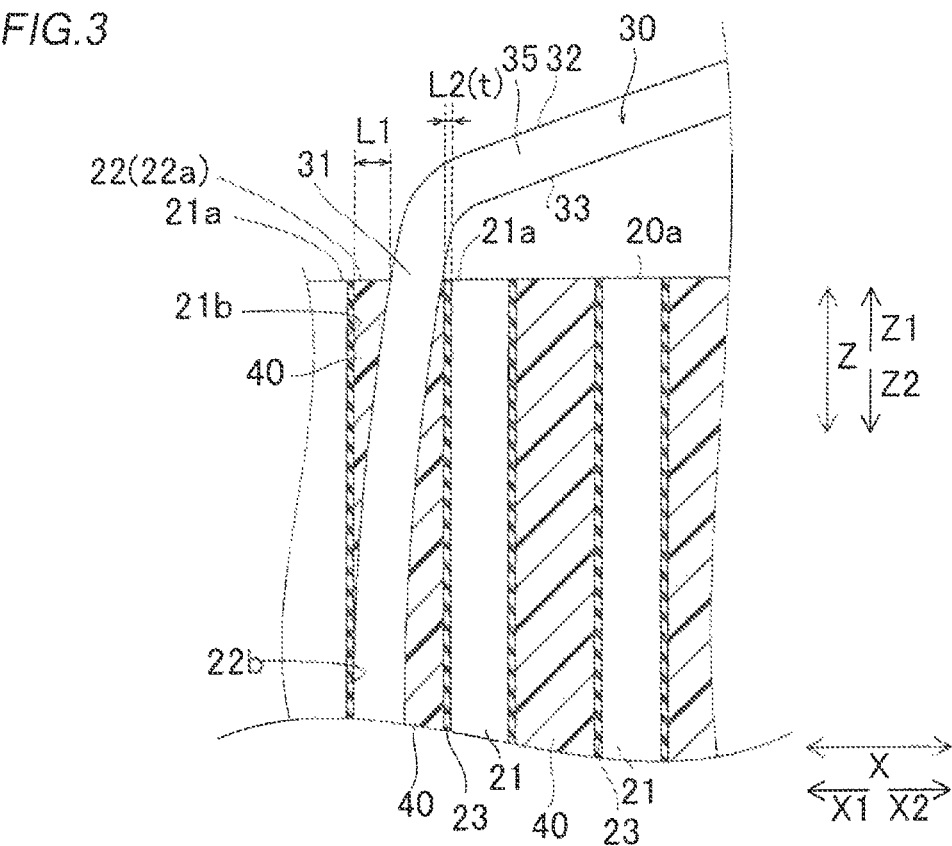
FIG. 3 is a partial enlarged view of FIG. 2.

In the first embodiment, as shown in FIG. 3, the interval L1 in the circumferential direction between the concentric coil 30 and the tooth 21 (corresponding portion 21b) on the side (X1 direction side) facing the outer peripheral surface 32 of the concentric coil 30 gradually decreases from an axial end 22a of the slot 22 toward an axial middle portion 22b of the slot 22. Specifically, the interval L1 in the circumferential direction between the concentric coil 30 and the tooth 21 (corresponding portion 21b) facing the outer peripheral surface 32 of the concentric coil 30 gradually decreases from the axial end 22a of the slot 22 and toward the vicinity of the axial middle portion 22b of the slot 22 so that the interval L1 in the circumferential direction between the concentric coil 30 and the tooth 21 (corresponding portion 21b) becomes the smallest in the vicinity of the axial middle portion 22b of the slot 22. The outer peripheral surface 32 of the concentric coil 30 and the insulating paper 23 are in contact with each other in the vicinity of the axial middle portion 22b of the slot 22.

As shown in FIG. 2, the concentric coil 30 has a substantially symmetrical shape with respect to an axis C2 passing through the center of the concentric coil 30 in the X direction, so that the Z direction side and the Z2 direction side of the concentric coil 30 are mirror images of each other. That is, in both of the axial end 311 and the axial end 312, the interval L1 in the circumferential direction between the concentric coil 30 and the tooth 21 (corresponding portion 21b) on the side (X1 direction side) facing the outer peripheral surface 32 of the concentric coil 30 gradually decreases from the axial end 22a of the slot 22 toward the axial middle portion 22b (the vicinity of the axial middle portion 22b) of the slot 22.

Namely, the concentric coil 30 is placed in the slot 22 such that the axial ends 31 (311, 312) of the concentric coil 30 which are located at the axial ends 22a of the slot 22 are located closer to the axis C1 of the concentric coil 30. The concentric coil 30 is placed in the slot 22 such that a coil portion 313 of the concentric coil 30 which is located in the vicinity of the axial middle portion 22b of the slot 22 is located farther away from the axis C1 of the concentric coil 30.

(Structure of Two Concentric Coils Placed in Slot)

Figure 4:
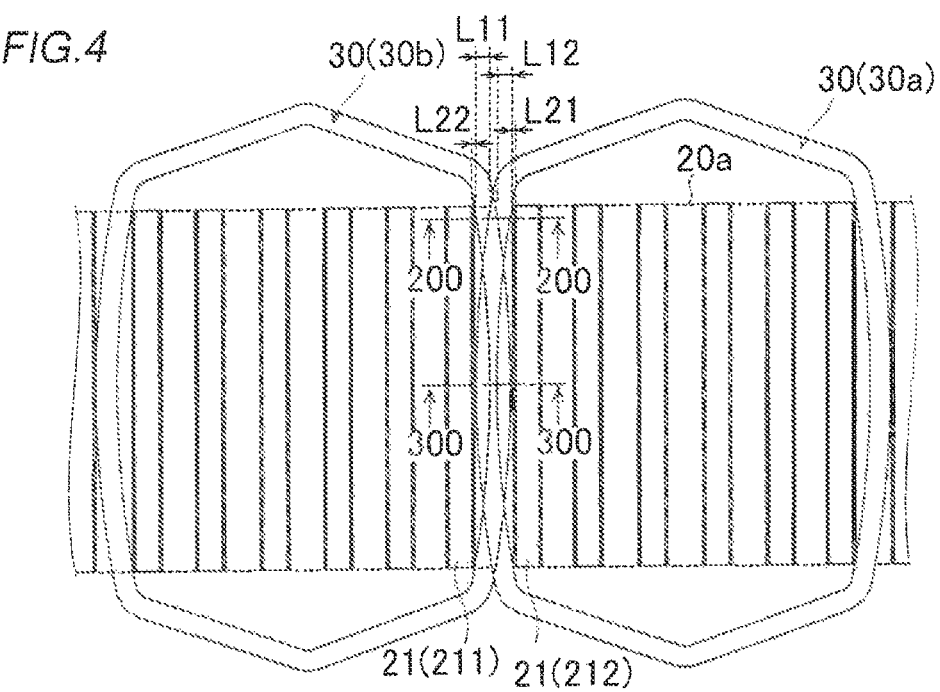
FIG. 4 is a diagram showing two concentric coils placed in slots of the rotating electrical machine according to the first embodiment of the present disclosure.

The structure of two concentric coils 30 placed in a single slot 22 will be described with reference to FIG. 4. Although two concentric coils 30 (30a, 30b) placed in a single slot 22 are shown in FIG. 4, two concentric coils 30 (30a, 30b) are actually placed in every slot 22.

Figure 5:
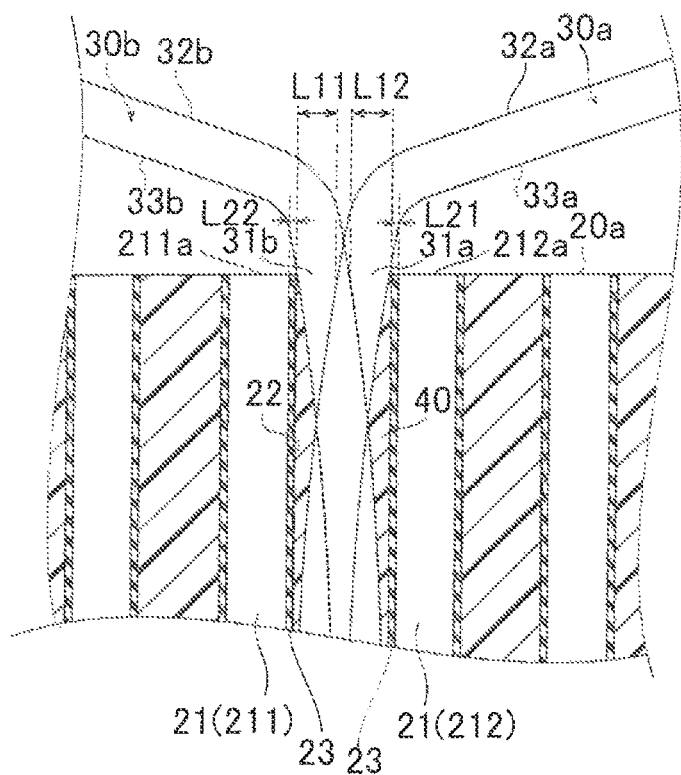
FIG. 5 is a partial enlarged view of FIG. 4.

As shown in FIG. 5, the concentric coils 30 include a first concentric coil 30a and a second concentric coil 30b which are placed in the same slot 22 located between a first tooth 211 and a second tooth 212 which are adjacent to each other. An outer peripheral surface 32a of a first axial end 31a of a slot accommodated portion 36 of the first concentric coil 30a about the winding center C of the concentric coil 30 faces the first tooth 211, and an outer peripheral surface 32b of a second axial end 31b of a slot accommodated portion 36 of the second concentric coil 30b about the winding center C of the concentric coil 30 faces the second tooth 212.

In the first embodiment, an interval L11 in the circumferential direction between the first axial end 31a of the first concentric coil 30a and an axial end 211a of the first tooth 211 facing the outer peripheral surface 32a of the first axial end 31a of the first concentric coil 30a is larger than an interval L21 in the circumferential direction between the first axial end 31a of the first concentric coil 30a and an axial end 212a of the second tooth 212 facing an inner peripheral surface 33a of the first axial end 31a. The interval L11 is equal to the interval L1, and the interval L21 is equal to the interval L2.

An interval L12 in the circumferential direction between the axial end 31b of the second concentric coil 30b and the axial end 212a of the second tooth 212 facing the outer peripheral surface 32b of the second axial end 31b of the second concentric coil 30b is larger than an interval L22 in the circumferential direction between the second axial end 31b of the second concentric coil 30b and the axial end 211a of the first tooth 211 facing an inner peripheral surface 33b of the second axial end 31b. The interval L12 is equal to the interval L1, and the interval L22 is equal to the interval L2.

Figure 6:
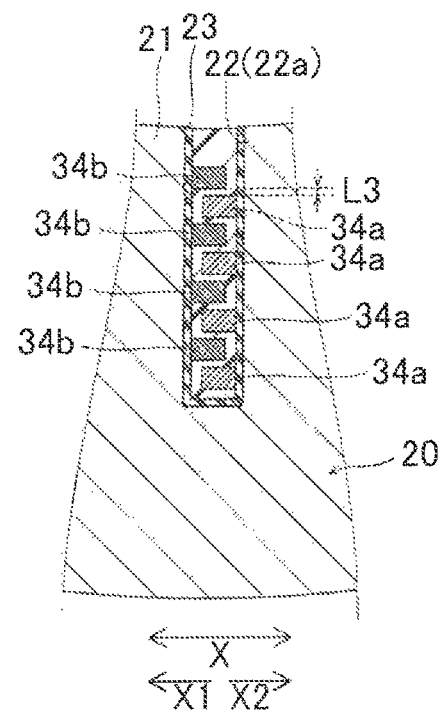
FIG. 6 is a sectional view taken along line 200-200 in FIG. 4.
Figure 7:
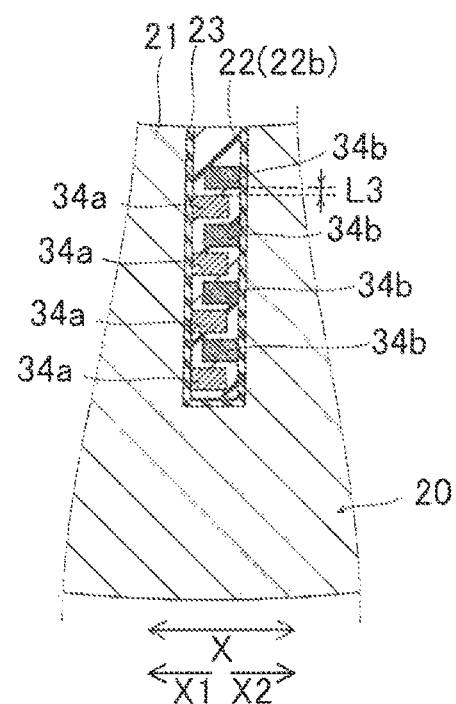
FIG. 7 is a sectional view taken along line 300-300 in FIG. 4.

As shown in FIGS. 6 and 7, the first concentric coil 30a and the second concentric coil 30b are formed by concentrically winding a rectangular wire 34a and a rectangular wire 34b into a plurality of turns. In the first embodiment, in the same slot 22 where the first concentric coil 30a and the second concentric coil 30b are placed, the turns of the rectangular wire 34a of the first concentric coil 30a and the turns of the rectangular wire 34b of the second concentric coil 30b are alternately arranged at intervals L3 in the radial direction.

Specifically, as shown in FIG. 6, on the axial end 22a side of the slot 22, the turns of the rectangular wire 34a of the first concentric coil 30a are placed on the X2 direction side of the slot 22, and the turns of the rectangular wire 34b of the second concentric coil 30b are placed on the X1 direction side of the slot 22. As shown in FIG. 7, in the vicinity of the axial middle portion 22b of the slot 22, the turns of the rectangular wire 34a of the first concentric coil 30a are placed on the X1 direction side of the slot 22, and the turns of the rectangular wire 34b of the second concentric coil 30b are placed on the X2 direction side of the slot 22. That is, the turns of the rectangular wire 34a of the first concentric coil 30a and the turns of the rectangular wire 34b of the second concentric coil 30b are arranged so as to cross each other in the slot 22 as viewed from the radially inner side of the stator core 20.

(Description of Varnish Filling Slots)

Varnish 40 filling the slots 22 will be described with reference to FIGS. 3 and 5 to 7. The varnish 40 filling the slots 22 is not shown in FIGS. 1, 2, and 4. The varnish 40 is one example of the "fixing agent."

As shown in FIGS. 3 and 5 to 7, the varnish 40 fills between each concentric coil 30 and the insulating paper 34 placed in the slot 22. That is, in the first embodiment, as shown in FIG. 3, the varnish 40 fills between the axial end 31 of the slot accommodated portion 36 and the tooth 21 facing the outer peripheral surface 32 of the axial end 31 and between the axial end 31 of the slot accommodated portion 36 and the tooth 21 facing the inner peripheral surface 33 of the axial end 31. As shown in FIGS. 6 and 7, the varnish 40 fills between each turn of the rectangular wire 34a of the first concentric coil 30a and each turn of the rectangular wire 34b of the second concentric coil 30b which face each other in the radial direction.

(Effects of Structure of First Embodiment)

The first embodiment has the following effects.

In the case of a coil made of a rectangular wire, a possible method to impregnate the space between the coil made of a rectangular wire and each coil mounting portion (slot) of a stator with varnish is to drop varnish from above into the coil made of a rectangular wire by using gravity rather than by using capillary action so that the varnish flows down. In the method in which varnish is dropped from above into a coil made of a rectangular wire by using gravity so that the varnish flows down, the amount of varnish (fixing agent) filling a slot varies depending on the positional relationship between an axial end of a slot accommodated portion and the slot. Accordingly, the coil is not sufficiently fixed if the amount of varnish is small. In the first embodiment, as shown in FIG. 3, the interval L1 in the circumferential direction of the stator core 20 between the outer peripheral surface 32 of the axial end 31 of the slot accommodated portion 36 of the concentric coil 30 about the winding center of the concentric coil 30 and the tooth 21 facing the outer peripheral surface 32 is larger than the interval L2 in the circumferential direction of the stator core 20 between the inner peripheral surface 33 of the axial end 31 of the slot accommodated portion 36 of the concentric coil 30 about the winding center of the concentric coil 30 and the tooth 21 facing the inner peripheral surface 33. Accordingly, in the case where the varnish 40 is dropped onto the outer peripheral surface 32 of the concentric coil 30, the varnish 40 can be easily guided into the slot 22 when flowing along the outer peripheral surface 32 of the concentric coil 30, because the interval L1 (clearance) in the circumferential direction between the outer peripheral surface 32 of the axial end 31 and the tooth 21 is large at the axial end 21a of the tooth 21 (the axial end 22a of the slot 22). As a result, even in the case of using the concentric coil 30 made of a rectangular wire, the slots 22 can be sufficiently filled with the varnish 40 and the concentric coil 30 can be fixed firmly.

In the first embodiment, as shown in FIG. 3, the interval L1 in the circumferential direction between the concentric coil 30 and the tooth 21 (corresponding portion 21b) facing the outer peripheral surface 32 of the concentric coil 30 gradually decreases from the axial end 22a of the slot 22 toward the axial middle portion 22b of the slot 22. Accordingly, in the vicinity of the axial end 22a of the slot 22, the varnish 40 is guided into the slot 22 mainly by gravity, whereas on the axial middle portion 22b side of the slot 22, the varnish 40 is guided into the slot 22 by capillary action in addition to gravity. The slot 22 is thus smoothly filled with the varnish 40.

In the first embodiment, as shown in FIG. 3, the interval L1 in the circumferential direction between the concentric coil 30 and the tooth 21 (corresponding portion 21b) facing the outer peripheral surface 32 of the concentric coil 30 gradually decreases from the axial end 22a of the slot 22 toward the vicinity of the axial middle portion 22b of the slot 22 so that the interval L1 in the circumferential direction between the concentric coil 30 and the tooth 21 (corresponding portion 21b) is the smallest in the vicinity of the axial middle portion 22b of the slot 22. However, the varnish 40 flows along the axial end 31 and flows to the back surface of the axial end 31, so that the varnish 40 can smoothly fill (be guided) down to the vicinity of the axial middle portion 22b of the slot 22.

In the first embodiment, as shown in FIG. 2, the interval L1 in the circumferential direction between each of the axial ends 31 (311, 312) of the concentric coil 30 which are located at both ends on one side and the other side in the axial direction of the slot 22 and the tooth 21 (each axial end 21a) facing the outer peripheral surface 32 of the axial end 31 is larger than the interval L2 in the circumferential direction between each of the axial ends 31 and the tooth 21 (each axial end 21a) facing the inner peripheral surface 33 of the axial end 31. The varnish 40 can thus be easily guided into the slot 22 on both the one side and the other side in the axial direction of the slot 22, whereby the slot 22 can thus be more effectively filled with the varnish 40.

In the first embodiment, as shown in FIG. 5, the interval L11 in the circumferential direction between the first axial end 31a of the first concentric coil 30a and the first tooth 211 (axial end 211a) facing the outer peripheral surface 32a of the first axial end 31a of the first concentric coil 30a is larger than the interval L21 in the circumferential direction between the first axial end 31a of the first concentric coil 30a and the second tooth 212 (axial end 212a) facing the inner peripheral surface 33a of the first axial end 31a. The interval L12 in the circumferential direction between the second axial end 31b of the second concentric coil 30b and the second tooth 212 (axial end 212a) facing the outer peripheral surface 32b of the second axial end 31b of the second concentric coil 30b is larger than the interval L22 in the circumferential direction between the second axial end 31b of the second concentric coil 30b and the first tooth 211 (axial end 211a) facing the inner peripheral surface 33b of the second axial end 31b. Accordingly, even when the first concentric coil 30a and the second concentric coil 30b are placed in a single slot 22, the varnish 40 can be easily guided into the slot 22.

In the first embodiment, as shown in FIGS. 6 and 7, in the same slot 22 where the first concentric coil 30a and the second concentric coil 30b are placed, the turns of the rectangular wire 34a of the first concentric coil 30a and the turns of the rectangular wire 34b of the second concentric coil 30b are alternately arranged at the intervals L3 in the radial direction. The varnish 40 thus fills between each turn of the rectangular wire 34a of the first concentric coil 30a and each turn of the rectangular wire 34b of the second concentric coil 30b, whereby the first concentric coil 30a and the second concentric coil 30b can be fixed firmly.

In the first embodiment, as shown in FIG. 3, the insulating paper 23 is disposed between the slot 22 and the concentric coil 30. The inner peripheral surface 33 of the axial end 31 is in contact with the insulating paper 23, so that the axial end 31 and the tooth 21 (axial end 21a) facing the inner peripheral surface 33 of the axial end 31 are separated by the interval L2 in the circumferential direction which corresponds to the thickness t of the insulating paper 23. Accordingly, unlike the case where the axial end 31 and the tooth 21 (axial end 21a) facing the inner peripheral surface 33 of the axial end 31 are separated by an interval larger than the thickness t of the insulating paper 23, the interval L1 in the circumferential direction between the axial end 31 located at the axial end 22a of the slot 22 and the tooth 21 (axial end 21a) facing the outer peripheral surface 32 of the axial end 31 can be increased. As a result, the varnish 40 can be more easily guided into the slot 22.

In the first embodiment, as shown in FIG. 3, the varnish 40 fills between the axial end 31 of the slot accommodated portion 36 and the tooth 21 facing the outer peripheral surface 32 of the axial end 31 and between the axial end 31 of the slot accommodated portion 36 and the tooth 21 facing the inner peripheral surface 33 of the axial end 31. Since the varnish 40 thus fills both the outer peripheral surface 32 side and the inner peripheral surface 33 side of the axial end 31, the concentric coil 30 can be fixed more firmly. Since the varnish 40 solidifies relatively quickly, the concentric coil 30 can be fixed relatively quickly.

(Manufacturing Method of Rotating Electrical Machine)

Figure 9:
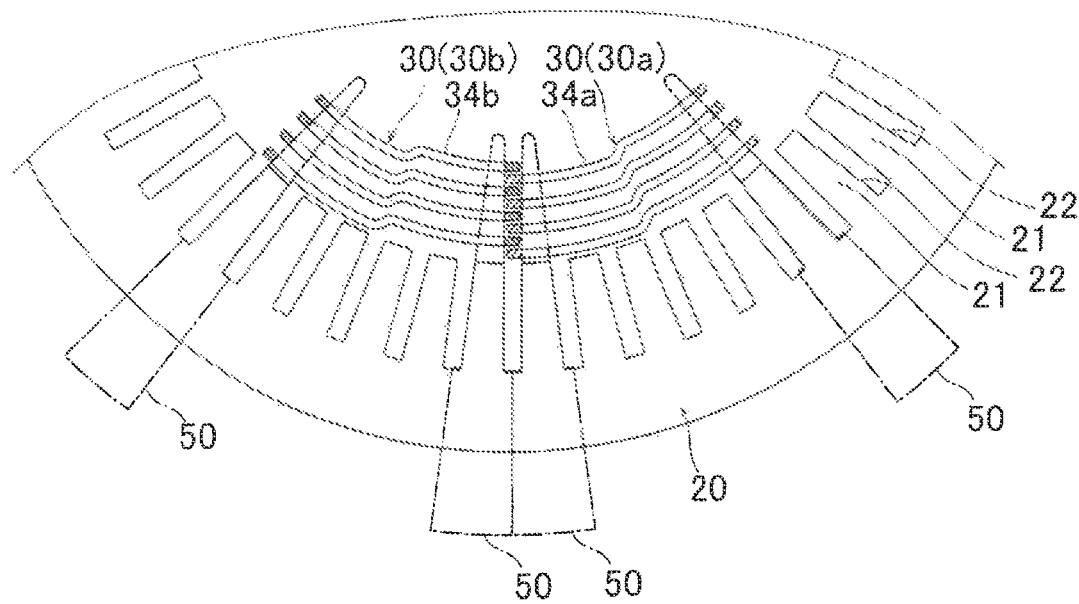
FIG. 9 is a diagram illustrating the step of placing concentric coils into slots.
Figure 10:
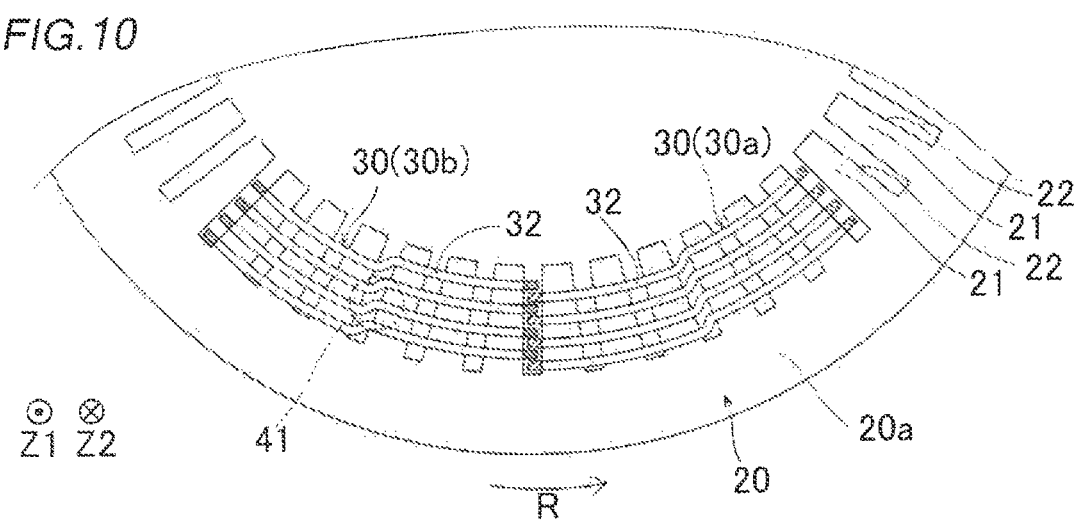
FIG. 10 is a diagram illustrating the step of dropping varnish onto concentric coils.

A method for manufacturing the rotating electrical machine 100 will be described with reference to FIGS. 1 and 8 to 11. FIGS. 9 and 10 show two concentric coils 30 (the first concentric coil 30a and the second concentric coil 30b) being placed in the slots 22 of the stator core 20.

Figure 8:
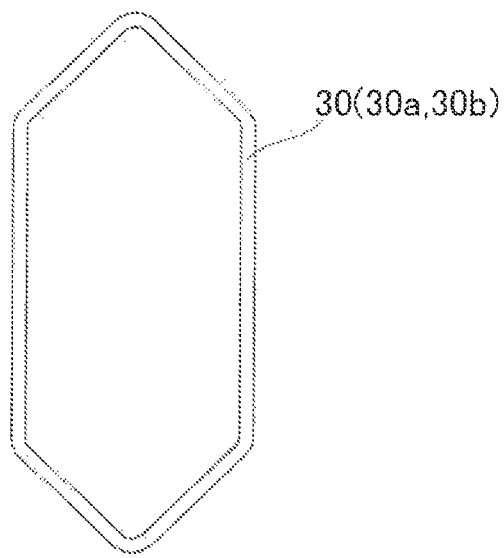
FIG. 8 is a diagram showing a concentric coil that has not been placed in slots.

As shown in FIG. 8, the concentric coils 30 (the first concentric coil 30a and the second concentric coil 30b) each formed by concentrically winding a rectangular wire are prepared.

As shown in FIG. 9, the first concentric coil 30a and the second concentric coil 30b are then attached to a jig 50 such that the turns of the rectangular wire 34a of the first concentric coil 30a and the turns of the rectangular wire 34b of the second concentric coil 30b are alternately arranged in the radial direction.

As shown in FIG. 10, in the first embodiment, the concentric coils 30 are placed in the slots 22 such that the interval L1 in the circumferential direction of the stator core 20 between the outer peripheral surface 32 of each axial end 31 of the slot accommodated portion 36 of the concentric coil 30 about the winding center of the concentric coil 30 and the tooth 21 facing the outer peripheral surface 32 in the circumferential direction of the stator core 20 is larger than the interval L2 in the circumferential direction of the stator core 20 between each axial end 31 and the tooth 21 facing the inner peripheral surface 33 of the axial end 31 of the slot accommodated portion 36 of the concentric coil 30 about the winding center of the concentric coil 30. Specifically, the concentric coils 30 (the first concentric coil 30a and the second concentric coil 30b) attached to the jig 50 are pressed outward in the radial direction so as to be inserted into the slot 22. Each concentric coil 30 is thus gradually widened in the circumferential direction and changes from the shape shown in FIG. 8 into the shape (barrel shape) shown in FIG. 11, namely such a shape that the inside width in the circumferential direction is large and those portions of the concentric coil 30 which are located in the slots 22 are curved along the axial direction.

Figure 11:
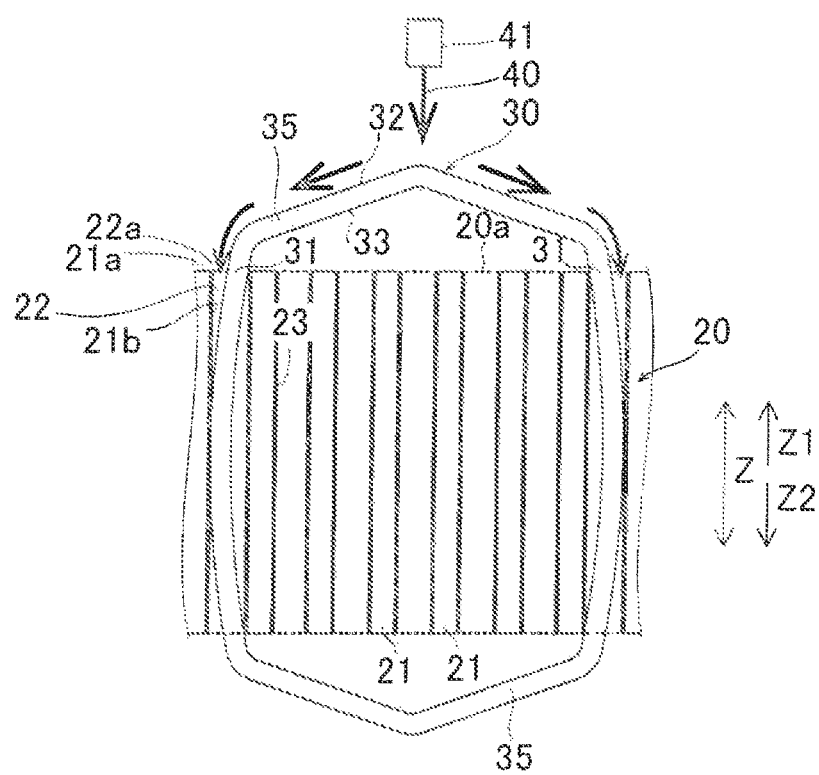
FIG. 11 is a diagram showing how varnish is dropped onto a concentric coil.

As shown in FIG. 10, in the first embodiment, with the stator core 20 being placed so that its axial end face 20a faces upward (in the Z1 direction), the varnish 40 is supplied from above to flow (dropped to flow down) along the outer peripheral surfaces 32 of the concentric coils 30, whereby the slots 22 are filled with the varnish 40. Specifically, with the stator core 20 being rotated in the circumferential direction (R direction), the varnish 40 is dropped onto the coil ends 35 from a varnish dropping device 41. As shown in FIG. 11, the varnish 40 thus flows along the outer peripheral surfaces 32 of the concentric coils 30 (coil ends 35) into the slots 22. In the vicinity of the axial end 22a of each slot 22, the varnish 40 is guided into the slot 22 mainly by gravity, whereas on the axial middle portion 22b side of each slot 22, the varnish 40 is guided into the slot 22 by capillary action in addition to gravity.

The varnish 40 is dropped on each side of the stator core 20, namely on one side (Z1 direction side) and the other side (Z2 direction side) of the stator core 20. The stator core 20 may be rotated 360 degrees, or if the varnish 40 is not sufficiently dropped onto a plurality of concentric coils 30 (into the slots 22) with the one full rotation of the stator core 20, the stator core 20 may be rotated 360 degrees a plurality of times with the radial position from which the varnish 40 is dropped being shifted after each full rotation of the stator core 20.

The varnish 40 thus fixes the concentric coils 30 and the insulating paper 34 together and fixes the turns of the rectangular wires of the concentric coils 30. This improves heat transfer properties between the concentric coil 30 and the stator core 20.

(Effects of Manufacturing Method of First Embodiment)

The first embodiment has the following effects.

In the first embodiment, the rotating electrical machine 100 is manufactured as described above, so that the varnish 40 can be easily guided into the slots 22 as shown in FIG. 11. As a result, even in the case of using the concentric coils 30 made of a rectangular wire, the rotating electrical machine 100 having the slots 22 sufficiently filled with the varnish 40 and having the firmly fixed concentric coils 30 can be manufactured.

In the first embodiment, as shown in FIG. 10, the varnish 40 is dropped onto the coil ends 35 of the concentric coils 30 with the stator core 20 being rotated. The varnish 40 can thus be easily dropped onto the plurality of concentric coils 30 placed in the plurality of slots 22.

Second Embodiment

The structure of a rotating electrical machine 110 according to a second embodiment will be described with reference to FIG. 12.

As in the first embodiment, in a concentric coil 130 of the rotating electrical machine 110, an interval L4 in the circumferential direction between an axial end 131 of a concentric coil 130 which is located at an axial end 22a of a slot 22 and one of adjacent teeth 21 (axial end 21a) which faces an outer peripheral surface 132 of the axial end 131 is larger than an interval L5 in the circumferential direction between the axial end 131 and the tooth 121 (axial end 21a) facing an inner peripheral surface 133 of the axial end 131.

In the second embodiment, the interval L4 in the circumferential direction between the concentric coil 130 and the tooth 21 (corresponding portion 21b) facing the outer peripheral surface 132 of the concentric coil 130 gradually decreases from the axial end 22a on the Z1 direction side of the slot 22 toward an axial middle portion 22b of the slot 22, and then gradually increases toward the vicinity of the axial middle portion 22b of the slot 22. The interval L4 then gradually decreases, and thereafter gradually increases toward the axial end 22a on the Z2 direction side. The portion of the concentric coil 130 which is placed in the slot 22 thus has a winding shape (wave shape). In other words, the portion of the concentric coil 130 which is placed in the slot 22 has a W-shape.

Other configurations of the second embodiment and a method for manufacturing the rotating electrical machine 110 of the second embodiment are similar to the first embodiment.

(Effects of Second Embodiment)

The second embodiment has the following effects.

Figure 12:
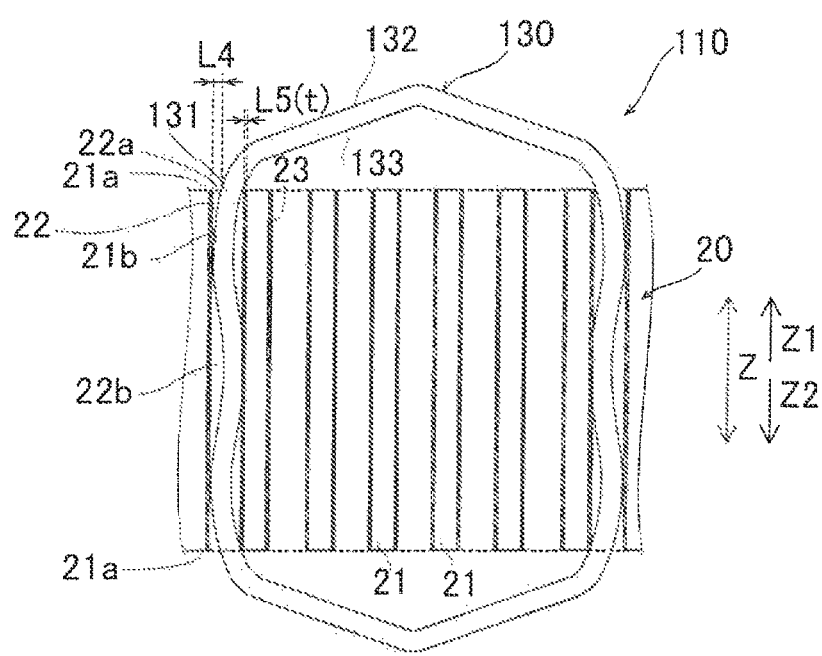
FIG. 12 is a diagram showing a single concentric coil placed in slots of a rotating electrical machine according to a second embodiment of the present disclosure.

In the second embodiment, as shown in FIG. 12, the interval L4 in the circumferential direction between the concentric coil 130 and the tooth 21 (corresponding portion 21b) facing the outer peripheral surface 132 of the concentric coil 130 gradually decreases from the axial end 22a of the slot 22 toward the axial middle portion 22b of the slot 22, and then gradually increases toward the vicinity of the axial middle portion 22b of the slot 22. Accordingly, in the case where two concentric coils 30 (the first concentric coil 30a and the second concentric coil 30b) are placed in a single slot 22 (see FIGS. 6 and 7), the number of times the first concentric coil 30a and the second concentric coil 30b intersect as viewed from the radially inner side of the stator core 20 is larger (four times) than in the first embodiment (twice). As a result, the area where the interval between the first concentric coil 30a and the second concentric coil 30b is small is increased, which makes it easy to more smoothly guide varnish 40 into the slots 22 by capillary action.

Other effects of the second embodiment are similar to those of the first embodiment.

Modifications

The embodiments disclosed herein are merely by way of example in all respects and should not be construed as restrictive.

For example, the first and second embodiments are described with respect to an example in which the inner peripheral surface of the axial end is in contact with the insulating paper and the axial end and the axial end of the tooth facing the inner peripheral surface of the axial end are separated by the interval corresponding to the thickness of the insulating paper. However, the present disclosure is not limited to this. For example, the inner peripheral surface of the axial end may not be in contact with the insulating paper.

The first and second embodiments are described with respect to an example in which the interval in the circumferential direction between the concentric coil and the tooth facing the outer peripheral surface of the concentric coil gradually decreases from the axial end of the slot toward the axial middle portion of the slot. However, the present disclosure is not limited to this. For example, the concentric coil may be formed so that the interval in the circumferential direction between the concentric coil and the tooth facing the outer peripheral surface of the concentric coil does not change from the axial end of the slot toward the axial middle portion of the slot. That is, the portion of the concentric coil which is placed in the slot may have a linear shape along the tooth (in the Z direction).

The first and second embodiments are described with respect to an example in which the interval in the circumferential direction between each of the axial ends of the concentric coil which are located at both ends on one side and the other side in the axial direction of the slot and the tooth facing the outer peripheral surface of the axial end is larger than the interval in the circumferential direction between each of the axial ends and the tooth facing the inner peripheral surface of the axial end. However, the present disclosure is not limited to this. For example, the concentric coil may be formed so that the interval in the circumferential direction between the axial end of the concentric coil which is located at one of the ends on one side and the other side in the axial direction of the slot and the tooth facing the outer peripheral surface of the axial end is larger than the interval in the circumferential direction between the axial end and the tooth facing the inner peripheral surface of the axial end.

The first and second embodiments are described with respect to an example in which two concentric coils are placed in the same slot. However, the present disclosure is not limited to this. For example, a single concentric coil or three or more concentric coils may be placed in the same slot.

The first and second embodiments are described with respect to an example in which insulating paper is placed between each slot and the concentric coil. However, the present disclosure is not limited to this. In the present disclosure, an insulating member other than insulating paper may be placed between each slot and the concentric coil.

The first and second embodiments are described with respect to an example in which the teeth are filled with varnish. However, the present disclosure is not limited to this. In the present disclosure, the teeth may be filled with a fixing agent other than varnish (e.g., an adhesive).

The first and second embodiments are described with respect to an example in which varnish is dropped onto the coil ends of the concentric coils with the stator core being rotated. However, the present disclosure is not limited to this. For example, varnish may be dropped onto the coil ends of the concentric coils with the stator core being held stationary.

The invention claimed is:

1. A stator, comprising:
   a stator core including a plurality of teeth and a plurality of slots each located between adjacent ones of the teeth; and
   a concentric coil formed by concentrically winding a rectangular wire and placed in the slots of the stator core, wherein
      an interval in a circumferential direction of the stator core between an outer peripheral surface of an axial end of a slot accommodated portion of the concentric coil about a winding center of the concentric coil and the tooth facing the outer peripheral surface is larger than an interval in the circumferential direction of the stator core between an inner peripheral surface of the axial end of the slot accommodated portion of the concentric coil about the winding center of the concentric coil and the tooth facing the inner peripheral surface,
      an interval in the circumferential direction between the concentric coil and the tooth facing an outer peripheral surface of the concentric coil decreases from an axial end of the slot toward an axial middle portion of the slot,
      the interval in the circumferential direction between the concentric coil and the tooth facing the outer peripheral surface of the concentric coil gradually decreases from the axial end of the slot toward the axial middle portion of the slot, and then increases toward a vicinity of the axial middle portion of the slot.

2. The stator according to claim 1, wherein
   the interval in the circumferential direction between each of the axial ends of the concentric coil which are located at both ends on one side and the other side in an axial direction of the slot and the tooth facing the outer peripheral surface of the axial end is larger than the interval in the circumferential direction between each of the axial ends and the tooth facing the inner peripheral surface of the axial end.

3. The stator according to claim 2, wherein
   the teeth includes a first tooth and a second tooth which are located adjacent to each other,
   the concentric coil includes a first concentric coil and a second concentric coil which are placed in the same slot located between the first and second teeth located adjacent to each other, and the outer peripheral surface of the axial end of the slot accommodated portion of the first concentric coil about the winding center of the concentric coil faces the first tooth and the outer peripheral surface of the axial end of the slot accommodated portion of the second concentric coil about the winding center of the concentric coil faces the second tooth,
   an interval in the circumferential direction between a first axial end of the first concentric coil and the first tooth facing an outer peripheral surface of the first axial end of the first concentric coil is larger than an interval in the circumferential direction between the first axial end of the first concentric coil and the second tooth facing an inner peripheral surface of the first axial end, and
   an interval in the circumferential direction between a second axial end of the second concentric coil and the second tooth facing an outer peripheral surface of the second axial end of the second concentric coil is larger than an interval in the circumferential direction between the second axial end of the second concentric coil and the first tooth facing an inner peripheral surface of the second axial end.

4. The stator according to claim 3, wherein
   in the same slot where the first concentric coil and the second concentric coil are placed, turns of a rectangular wire of the first concentric coil and turns of a rectangular wire of the second concentric coil are alternately arranged at intervals in a radial direction.

5. The stator according to claim 4, further comprising:
   an insulating member placed between the slot and the concentric coil, wherein
   the inner peripheral surface of the axial end is in contact with the insulating member, and
   the axial end and the tooth facing the inner peripheral surface of the axial end are separated by an interval in the circumferential direction which corresponds to a thickness of the insulating member.

6. The stator according to claim 5, further comprising:
   a fixing agent that fills between the axial end of the slot accommodated portion and the tooth facing the outer peripheral surface of the axial end and between the axial end of the slot accommodated portion and the tooth facing the inner peripheral surface of the axial end.

7. The stator according to claim 6, wherein
   the fixing agent includes varnish.

8. The stator according to claim 1, wherein
   the teeth includes a first tooth and a second tooth which are located adjacent to each other,
   the concentric coil includes a first concentric coil and a second concentric coil which are placed in the same slot located between the first and second teeth located adjacent to each other, and the outer peripheral surface of the axial end of the slot accommodated portion of the first concentric coil about the winding center of the concentric coil faces the first tooth and the outer peripheral surface of the axial end of the slot accommodated portion of the second concentric coil about the winding center of the concentric coil faces the second tooth,
   an interval in the circumferential direction between a first axial end of the first concentric coil and the first tooth facing an outer peripheral surface of the first axial end of the first concentric coil is larger than an interval in the circumferential direction between the first axial end of the first concentric coil and the second tooth facing an inner peripheral surface of the first axial end, and an interval in the circumferential direction between a second axial end of the second concentric coil and the second tooth facing an outer peripheral surface of the second axial end of the second concentric coil is larger than an interval in the circumferential direction between the second axial end of the second concentric coil and the first tooth facing an inner peripheral surface of the second axial end.

9. The stator according to claim 8, wherein
in the same slot where the first concentric coil and the second concentric coil are placed, turns of a rectangular wire of the first concentric coil and turns of a rectangular wire of the second concentric coil are alternately arranged at intervals in a radial direction.

10. The stator according to claim 1, further comprising:
an insulating member placed between the slot and the concentric coil, wherein
the inner peripheral surface of the axial end is in contact with the insulating member, and
the axial end and the tooth facing the inner peripheral surface of the axial end are separated by an interval in the circumferential direction which corresponds to a thickness of the insulating member.

11. The stator according to claim 1, further comprising:
a fixing agent that fills between the axial end of the slot accommodated portion and the tooth facing the outer peripheral surface of the axial end and between the axial end of the slot accommodated portion and the tooth facing the inner peripheral surface of the axial end.

12. A stator, comprising:
a stator core including a plurality of teeth and a plurality of slots each located between adjacent ones of the teeth;
d
a concentric coil formed by concentrically winding a rectangular wire and placed in the slots of the stator core, wherein
an interval in a circumferential direction of the stator core between an outer peripheral surface of an axial end of a slot accommodated portion of the concentric coil about a winding center of the concentric coil and the tooth facing the outer peripheral surface is larger than an interval in the circumferential direction of the stator core between an inner peripheral surface of the axial end of the slot accommodated portion of the concentric coil about the winding center of the concentric coil and the tooth facing the inner peripheral surface;
an insulating member placed between the slot and the concentric coil, wherein
the inner peripheral surface of the axial end is in contact with the insulating member, and
the axial end and the tooth facing the inner peripheral surface of the axial end are separated by an interval in the circumferential direction which corresponds to a thickness of the insulating member; and
a fixing agent that fills between the axial end of the slot accommodated portion and the tooth facing the outer peripheral surface of the axial end and between the axial end of the slot accommodated portion and the tooth facing the inner peripheral surface of the axial end.

* * * * *